INVENTORS.
Emile Plumat
Robert Van Laethem

BY Spencer & Kaye
ATTORNEYS.

INVENTORS.
Emile Plumat
Robert Van Laethem

United States Patent Office 3,676,097
Patented July 11, 1972

3,676,097
PHYSICALLY STRENGTHENING BODIES MADE OF AT LEAST PARTLY VITREOUS MATERIAL
Emile Plumat, Gilly, and Robert van Laethem, Loverval, Belgium, assignors to Glaverbel S.A., Watermael-Boitsfort, Belgium
Filed Apr. 26, 1968, Ser. No. 724,490
Claims priority, application Luxembourg, Apr. 27, 1967, 53,548
Int. Cl. C03b 29/00; C03c 17/00
U.S. Cl. 65—33
7 Claims

ABSTRACT OF THE DISCLOSURE

A process for physically strengthening a body made of vitreous or partly vitreous material by providing the body with surface layers or coatings of a material whose composition is such that at least one coating ingredient can undergo a solid-to-solid phase transformation which gives the coating a hardness at least equal to that of the body, and causing such phase transformation to take place.

BACKGROUND OF THE INVENTION

This invention relates to a method of strengthening bodies made of vitreous or partly vitreous material, such as vitroceramic material, and to bodies strengthened by such method.

The mechanical strength of bodies made of normally annealed glass or a material having a certain proportion of one or more vitreous phases, such as vitroceramic or vitrocrystalline material, is adversely affected by the presence of microscopic surface cracks or scratches. Such flaws act as stress-increasers when the surface in which they are present is subjected to tensile stress. Such microcracks may even propagate spontaneously and this explains why the tensile strength of a sheet of ordinary glass is twenty times lower than its compressive strength.

It is well known that the net tensile strength of glass can be improved by thermally tempering it. However, the temperature conditions involved in such treatment are liable to deform certain articles and thermal tempering is not therefore always a satisfactory solution to the problem.

Special glasses which have appreciable hardness and resistance to scratching and/or which can be thermally devitrified to increase their surface hardness, are also known. However, because of the ingredients which such glasses must have, they are expensive.

SUMMARY OF THE INVENTION

It is a primary object of the present invention to eliminate, or substantially reduce, these drawbacks and difficulties.

Another object of the invention is to provide high-strength vitreous or partly vitreous materials at a low cost.

Another object of the invention is to substantially improve the physical strength of such materials.

Still another object of the invention is to substantially improve the surface hardness of these materials.

Yet a further object of the invention is to substantially increase the bending strength of such materials.

A still further object of the invention is to eliminate the weakening effect of surface scratches on the tensile strength of such materials.

These and other objects according to the invention are achieved by a process for physically strengthening a body made of at least partly vitreous material, which process is carried out by attaching to the body a coating made of a material whose chemical composition is different from that of the body and is such that at least one coating ingredient can undergo a solid-to-solid phase transformation which gives the coating a hardness at least equal to that of the body, and then causing such phase transformation to take place.

It has been found that if a piece of glass having surface scratches is provided in this manner with a surface coating, which can be quite thin, which covers the scratched surface, the resulting coated glass can withstand appreciably higher tensile stresses than the uncoated glass. By virtue of the phase transformation in situ, the coating acts in some way to prevent propagation of the surface cracks but the reason for this phenomenon is not really understood.

DESCRIPTION OF THE PREFERRED EMBODIMENTS

Figure 1:
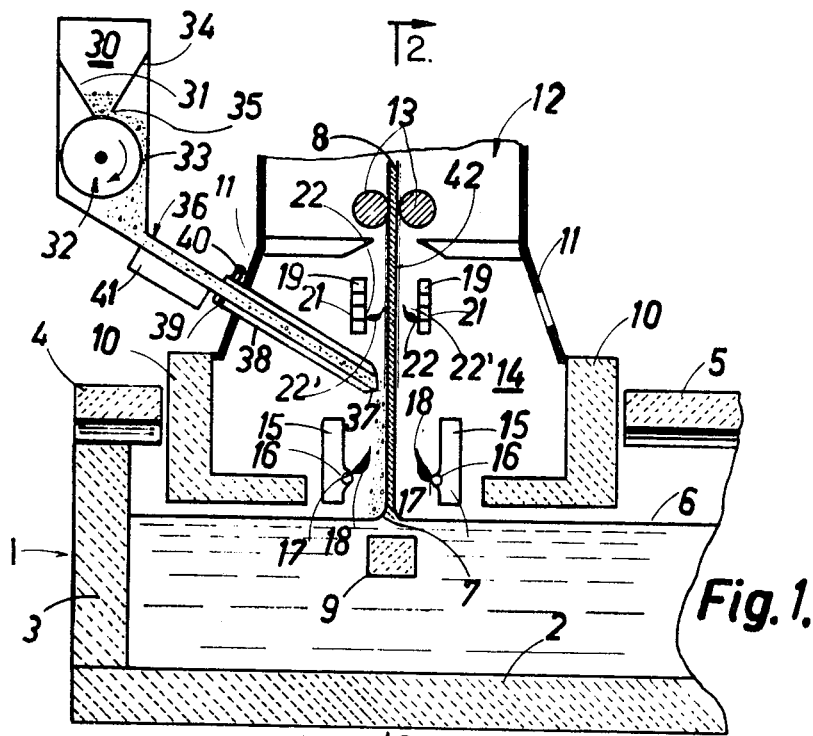
FIG. 1 is a cross-sectional, elevational view of part of of a Pittsburgh-type glass-drawing machine arranged for carrying out the present invention.

The invention is particularly, although not exclusively, intended for use in strengthening glass bodies such as flat or curved glass sheets or continuous glass ribbons, including drawn sheet glass and plate glass, and flasks, bottles, insulators, ampoules and other manufactured glass articles. The strengthening of a piece of glass will usually involve coating at least one major surface of the sheet or ribbon, if not also the edges thereof. However, depending on the nature of the coating composition, advantages can sometimes be gained by coating only the edges or only the edges and the adjacent marginal portions of the major surfaces of the sheet or ribbon. The application of the coating composition to the edges of a glass sheet and the subsequent treatment of the coating in accordance with the invention, as will be described in detail below, has been found to be particularly beneficial.

The invention can be applied with particular advantage for strengthening bodies made of glasses of ordinary composition, i.e. glasses formed from easily available inexpensive constituents such as silica, soda, lime and feldspar, since such glasses have remarkably good optical, acoustic and thermal properties and for many purposes require improvement only with regard to their mechanical properties.

Embodiments of the invention which are of special importance are constituted by processes in which a body of such an inexpensive glass is coated with a more easily crystallizable glass and the coating is crystallized or re-crystallized in situ.

If the coating is applied to the body in an amorphous state, this has certain advantages in that such an amorphous coating can be easily applied as a film having a smooth surface and uniform thickness.

According to certain embodiments of the invention, the coating composition is selected and applied to form a vitreous film in which a solid phase transformation, such as a separation of vitreous and crystalline phases, can be brought about by thermal treatment. Vitreous films adhere particularly well to vitreous and partly vitreous surfaces. Compact vitreous films can moreover have a considerable thickness, for example of the order of 1 mm.

As will hereafter be described with reference to specific examples, it is possible to coat a body with a vitreous film in which at least one crystalline phase can then easily be caused to separate by appropriate thermal treatment. Such a crystalline phase or phases may form a fairly fine network on the surface of the coated vitreous or vitrocrystalline material and will ensure that if this material is broken, it shatters into very small noncutting fragments.

However, certain vitreous films, when subjected to appropriate thermal treatment, undergo a phase separation in the sense that one or more new vitreous phases appear. A coating presenting different vitreous phases, and which has undergone phase transformation in situ in this way, can also prevent the glass from fracturing into cutting pieces or fragments. It has been found that various glass compositions which have not hitherto been thought to fall into the category of "demixing" glasses, are in fact suscetpible to the inducement of phase separation by suitable thermal treatment. Examples of such glasses will be given hereafter.

In other embodiments of the invention, the coating composition is selected, and applied, to form a crystalline coating in which a solid phase transformation can be brought about by thermal treatment. As will be later explained in detail, there can be formed coatings containing one or more crystalline phases and in which one or more new crystalline phases can be subsequently caused to appear by thermal treatment. The phase transformation may involve an interdiffusion or interpenetration of different crystalline phases, and this promotes the homogeneity of the coating. It has been found that in such crystalline coatings, mineral compounds with advantageous mechanical, optical, or chemical properties, e.g. spinels, can be easily and quickly formed.

Also, vitreous phases can be caused to appear in certain crystalline coating films. In general, thermal treatments for effecting this type of phase transformation involve heating the coating to the melting temperature and then cooling it fairly rapidly. This procedure is of course only applicable if the phase transformation occurs at a temperature lower than the deformation point of the coated vitreous or partly vitreous material.

For achieving special optical effects, such as increased light-reflectivity, it is of advantage to provide a coating which in its final, transformed state includes vitreous phases with a high refractive index, such phases containing, inter alia, an oxide of lead, bismuth or titanium.

The method according to the invention has the additional advantage that the final material may have a higher surface hardness as well as an improved tensile strength. It will be apparent that this feature is of importance in permitting a material with a high degree of surface hardness to be fabricated using, as a substrate, a glass not having any special constituents, for example a simple glass with a Mohs surface hardness of 7 or less.

The coating conferring the requisite surface hardness may contain hard constituents whose melting temperature is so high that they could not be used in manufacturing processes involving the drawing of glass or otherwise forming the glass into shaped bodies, but which can be applied to form a thin film according to one of the techniques hereinafter described. In order to achieve a high degree of surface hardness, it is useful to form a coating having at least one crystalline phase composed of quartz ($SiO_2$), zircon ($ZrSiO_4$), beryl ($Al_2Be_3Si_6O_{18}$), topaz ($Al_2SiO_4$)($FOH$)$_2$, $ZrB_2$, TiN, TaC, ZrC, corundum ($Al_2O_3$), $B_2C$, TiC, SiC or AlB.

A body of glass having such a crystalline coating is relatively inexpensive and can have a surface hardness which is greater than that of the mineral crystal. For instance, the Mohs hardness of topaz is 8, whereas a film formed of wide topaz crystals on glass having a Mohs hardness of 6.5 was found to have a Mohs hardness of 8.5.

Improved surface hardness can be conferred not only by coatings which are entirely crystalline but also by coatings which in their final state include both a crystalline phase or phases and a vitreous phase or phases. The vitreous phase may be a surface layer of the vitreous material of the substrate. In addition, if one or more crystalline powders, such as quartz or corundum, are sprinkled on a substrate of glass and the glass is heated to its softening temperature, the crystalline phase will be mechanically integrated into the surface layer of the glass and diffusion often occurs between the lattices of the crystals and the vitreous phase of the substrate.

It should be understood that the coating in which phase transformation occurs need not be absolutely continuous. Thus, small portions of a vitreous coated surface may be exposed. Moreover, the phase transformation can extend somewhat into the substrate surface and the adherence of the coating is thereby improved.

The coating can, of course, contain hard crystals formed either by a phase transformation from another crystalline phase or phases or by devitrification of a vitreous phase or phases. The latter procedure aids the formation of a hard thin film of uniform thickness.

A body coated by a process according to the invention can be subjected to a tempering, or toughening, treatment, for example in a manner analogous to the thermal tempering of glass, if the body is able to undergo such treatment without experiencing a deformation. Alternatively, compressive surface stresses can be produced or increased by the diffusion of ions into the coating from a contacting medium according to the known processes for chemically tempering glass.

A solid-to-solid phase transformation in the coating can, in most cases, be brought about, or initiated, by a thermal treatment. The expression "solid-to-solid phase transformation" includes those transformations in which at least one coating ingredient is changed from one solid form to another solid form and is intended to include transformations in which the constituents undergoing transformation pass through an intermediate molten or flowable state. In fact, a suitable thermal treatment may, in some cases, involve heating of the initially formed coating to bring it to an at least partially molten condition followed by cooling to a temperature range which is conducive to the appearance of a solid phase or phases different in physical structure and/or composition from any phase present in the initial vitreous, crystalline or vitrocrystalline coating. In all cases, however, there is a solid-to-solid phase transformation in that a material forming at least part of a solid coating on the substrate is transformed after a certain time so that it forms a phase or phases of different structure and/or composition from the phases which it previously formed in the solid coating. Such phase transformation can involve, for example, a change from one vitreous phase to a different vitreous phase, a vitrocrystalline phase, or a crystalline phase, or from one crystalline phase to a different crystalline phase, etc.

In using the expression "thermal treatment" we include not only treatments in which an increase in the temperature of the coating occurs to bring about the phase transformation. For example, constituents for forming an initial coating may be applied in a molten condition and, if the constituents are suitably chosen, the only thermal treatment subsequently necessary is a controlled cooling which causes the coating to pass through a predetermined cooling process which is appropriate for ensuring that after, or during, solidification of the coating a solid phase transformation will occur within the coating, this transformation appearing either during the cooling or subsequently after a time interval which may be relatively short or long. Depending on the composition of the coating, the phase transformation may take several seconds to several days.

There are important advantages in applying the coating composition to a vitreous or partly vitreous body while the body is in the process of being formed at an elevated temperature, for example during a drawing process in the case of sheet glass. In particular, this permits a considerable economy in heat consumption as compared with heated again preparatory to the application of a coating, processes in which the body is allowed to cool and is then heated again preparatory to the application of a coating. The coating of glass in the course of drawing it into sheets thus represents one important field of use of the invention. In such drawing processes the continuously drawn ribbon of glass is cut up into sheets as it leaves the drawing machine.

The coating composition can be applied in the drawing chamber of the drawing machine, for example a little above the glass meniscus. The coating ingredients may be, for example, salts applied in atomized or vaporized form or powders having a high melting temperature and applied by sprinkling, and may form on one or each surface of the glass a film which is firmly held by, or integral with, the glass. If the phase transformation which is eventually brought about in such coating gives it a hardness which makes cutting difficult, this is not necessarily a disadvantage since in some cases the phase transformation will not normally occur or be complete until after the time when cutting takes place in sheet glass manufacture. In cases in which the phase transformation would normally occur more quickly, it can be delayed.

The application of a coating composition to the vitreous or partly vitreous substrate while the latter is at a temperature above its softening point ensures that the coating will be well bonded to the substrate. In some cases there will be a release of volatile materials, such as $H_2O$, $H_2$, $NH_3$ in the form of microscopic bubbles which also signifies a phase transformation. Such bubbles may form active centers promoting solid phase transformation.

If a coating composition is applied in molten condition to a cooled glass surface, the applied composition tends to improve such surface by a kind of polishing action, so that this procedure also has its advantages.

A variety of coating techniques can be used for applying a coating composition in the performance of the invention. The choice of technique will of course have to take account of the nature of the composition ingredients in any given case. By way of example, the coating substances may be "sputtered" or brought, while in vapor form, into contact with the substrate, for example by evaporation of the coating substances in vacuo. By these methods, either thick or very thin amorphous layers of uniform thickness can be formed. Different constituents can be "sputtered" simultaneously or successively at rates which may be controlled during deposition. Alternatively, coating may be effected by immersion of the vitreous or partly vitreous body. This method permits fairly thick coatings to be formed from a glass which has a lower melting temperature than the material of the substrate. By way of example, the substrate or a surface thereof to be coated can be immersed in molten salts to form a crystalline coating or a coating of relatively soft glass.

Different coating methods may be used for applying different constituents of a given coating, either simultaneously or successively. Thus, for example, one constituent can be applied by evaporation in vacuo, and another constituent can be applied by immersion or sputtering.

In an actual test, coatings were formed on ordinary glass by sputtering SiO and $CaSiO_3$ followed by immersion of the glass in a suspension of $AgCl+NaOH$ and then by a thermal treatment to induce a phase separation. It was found that when the thermal treatment was performed at low temperature, the final coating possessed photographic properties. The phase transformation was constituted mainly by the appearance of a new crystalline phase. When the thermal treatment was performed at a higher temperature, the final coating possessed photographic properties, i.e., it became reversibly less transparent to light when exposed to light of increasing intensity, the original transparency being recovered automatically when the intensity of the irradiating light decreased. The phase transformation occurring as a result of the thermal treatment at the higher temperature resulted mainly in the appearance of a new vitreous phase.

In many cases phase transformation can be promoted by incorporating a doping agent in the coating composition. The effect of such an agent can be to reduce the time required for phase transformation to occur or to induce a phase transformation in glasses which would normally, on theoretical grounds, be considered incapable of demixing. As doping agents, particular reference can be made to oxides of the following elements: Ti, Mn, Cu, Co, Cd, Ni, Al, Zr, Rb, Fe, Mg, Be, V, rare earths and precious metals, the selection in a given case being such that the valency of the cation of the doping agent is different from that of the cations of those new phases whose formation is to be encouraged. The doping agents referred to can become associated with other compounds in complex phases of the coating film or they can form a distinct phase. For instance, a film formed from $SiO_2$, $Al_2O_3$ and $Na_2O$, in which phase separations as a rule occur after 10 hours at 800° C., can be separated into the same phases after 1 hour at 700° C., if 2% by weight of $TiO_2$ is added to the film, but the final film then includes a phase composed almost exclusively of $TiO_2$ in the form of rutilium.

Phase transformation in a coating can also be promoted by exposing the coating film to sound waves or ultrasonic waves, or vibration of a frequency higher than 10 kHz. and even exceeding 10 mHz. This treatment can be combined with some other treatment, for instance a thermal treatment. It has been found that by this technique the incipient separation of phases, either vitreous or crystalline, can be hastened to a considerable extent. Moreover, this process sometimes causes unusual crystallographic phases to be obtained, as is the case when the coating includes zinc, cadmium or one of their oxides. Preferably, the waves are produced by electrostriction or piezoelectric processes, or by means of barium titanate generators. More particularly, at extremely high frequencies they are preferably created by magnetostriction, for example by combining the action of a D.C. magnetic field and a high-frequency magnetic field oscillating either at the natural frequency of a sheet of steel disposed parallel with the surface of the sheet of glass or other substrate bearing the coating film, or at the natural frequency of the film itself, the fields acting to set up the desired vibration directly in the steel sheet or the film. More specifically, magnetic field levels corresponding to electrical power values varying from 50 to 3,000 watts/m.$^2$ of sheet or film surface have been used and have caused the phase separation speeds to be multiplied by coefficients of 10 to 1,000, depending on the power utilized.

The coating film formed in accordance with the invention can have, whether as a result of the thermal treatment or otherwise, a coefficient of expansion different from that of the vitreous or partly vitreous substrate. If the coating has a coefficient of expansion higher than that of the substrate, then treatments according to the invention can have the further beneficial effect of producing or increasing compressive stresses in the substrate surface, this being accompanied by tensile stresses in the coating, upon cooling of the article. However, it is permissible for the coating to have a lower coefficient of thermal expansion than the substrate, this tending to introduce tensile stresses in the substrate surface and compressive stresses in the coating, because the beneficial effect of the coating in preventing or reducing the risk of propagation of surface cracks in the substrate can predominate over the undesirable reduction of compressive stresses in the substrate surface or the production of tensile stresses therein, so that the effective tensile strength of the substrate is still improved.

Various specific embodiments of the invention will now be described with reference to the accompanying drawings.

Figure 2:
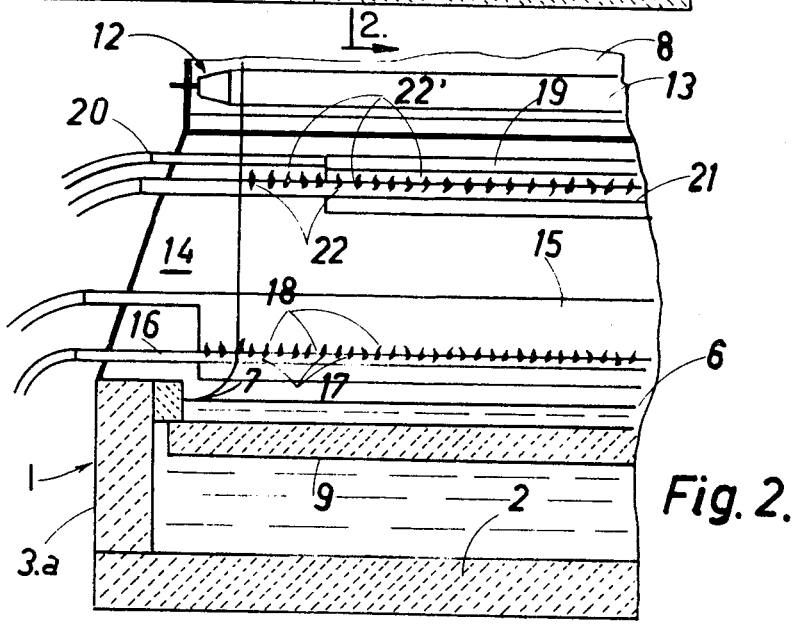
FIG. 2 is a cross-sectional partial view taken along the line 2—2 of FIG. 1.

FIGS. 1 and 2 show a glass-drawing kiln 1 having a bottom 2, an end wall 3, side walls 3a, and a crown or roof having a front element 4 and a central element 5. The surface level of the molten glass bath is indicated at 6. A ribbon of glass 8 is drawn from the molten mass, through drawing chamber 14. The meniscus 7 of the drawn glass ribbon 8 is stabilized by a draw bar 9 disposed equidistantly between two L-blocks 10. Inclined walls 11 connect the top ends of the blocks 10 to a tower section 12 housing pairs of drawing rollers, only one pair 13 of which is shown. The drawing rollers draw the ribbon 8 upwardly through the tower section. The cooled glass leaves the tower section at its top and is then cut into sheets.

Two main coolers 15 are disposed abreast of and to respectively opposite sides of the glass ribbon 8 in the drawing chamber close to the meniscus. Gas burner tubes 16 with gas discharge orifices 17 are disposed along the inner faces of the coolers 15 and provide series of flames 18. Higher in the drawing chamber 14 there are two auxiliary coolers 19 each supported at one end by a conduit 20 for supplying cooling fluid. The auxiliary coolers 19 are fitted with gas supply conduits 21 formed with apertures 22 to provide flames 22'.

A hopper 30 is provided and arranged to be fed with one or more impalpable, i.e. extremely fine, powders from suitable distributors (not shown). This hopper is formed by an inclined wall 31 touching a rotary distributing cylinder 32, the surface 33 of which is sanded, and by an inclined wall 34 of adjustable height whose bottom end 35 is disposed a short distance above the surface of the cylinder 32. The bottom end of the hopper 30 communicates with an inclined chute 36 which extends through one wall 11, the bottom end 37 of this chute being near the glass ribbon 8. The lower end portion of the chute which is exposed to the high temperatures in the drawing chamber is surrounded by a sleeve 38 through which water is circulated via openings 39 and 40. Electric vibrating elements 41 are attached to the bottom of the chute 36 for aiding the movement of the powders.

Powder feed equipment identical with the elements 30–41 is installed symmetrically at the other side of the drawing chamber for feeding powder to the other side of the glass ribbon but this further equipment has been omitted from the drawing for purposes of simplicity.

Powdered material is supplied in strictly metered amounts into the hopper 30 so as to keep it filled to a level slightly higher than that of the bottom end of the inclined wall 34. The cylinder 32 rotates clockwise, as shown by the arrow, and feeds the powder into the chute 36. The powder is delivered in a fine shower onto the surface of the glass ribbon 8 above the meniscus 7.

EXAMPLE 1

Glass made from a batch having the following composition, by weight:

| | Percent |
|---|---|
| $SiO_2$ | 70 |
| $Na_2O$ | 12 |
| $CaO$ | 10 |
| $MgO$ | 3 |
| $Fe_2O_3$ | Traces |
| $Al_2O_3$ | 5 | was drawn in apparatus of the type shown in FIGS. 1 and 2. The temperature of the glass at the meniscus 7 was 920° C. A ribbon drawn from such a glass has, in the cooled state, a surface hardness of about 6.6 on the Mohs scale.

The hopper 30 (and the other hopper which is not shown) were fed with a special powdered glass (grain dimensions between 10 and 50 microns) obtained from a batch having the following composition, by weight:

| | Percent |
|---|---|
| $ZnO$ | 60 |
| $B_2O_3$ | 20 |
| $SiO_2$ | 10 |
| $P_2O_5$ | 6 |
| $Al_2O_3$ | 2 |
| $Na_2O$ | 2 | the powder being obtained by melting the batch at 1000° C. and then refining, suddenly cooling, and finally crushing the material.

The powder leaving the chute 36 and the chute on the other side of the drawing chamber formed adherent coatings, such as 42, on the glass ribbon 8, the ribbon being still soft in the region where it is contacted by the powder. The applied powder was formed into viterous coating films in the tower section, the temperature at the upper end of which was 80° C. The coated glass could be readily cut even after storage for one hour at ambient temperature. However, a solid phase transformation had already commenced in the coatings by that time and, due to that fact, the glass was found to divide cleanly along the cutting line.

The phase transformation continued during storage and after 100 hours at ambient temperature the coatings were found to be composed of one vitreous phase of zinc borate and another vitreous phase of aluminum phosphosilicate. The coating film 42 on each side of the drawn glass ribbon had a uniform thickness of several fractions of a millimeter. The bending strength of the glass was found to be increased tenfold by the coatings as compared with an uncoated glass ribbon of identical composition.

EXAMPLE 2

Another process was performed which was identical to that just described except that 1% by weight of industrial $TiO_2$ (grain size <20 microns) was added to the above-described powdered glass in the hoppers.

The coating film were given the same thermal treatment, i.e. cooling from 920° C. to 80° C. in the tower section 12. The cooled coated glass could still be easily cut, but phase transformation in the coatings was then completed in ten hours. This acceleration can possibly be attributed to the titanium cations having a valency of +4, which valency differs from that of the aluminum cations (+3) and the zinc cations (+2). Moreover, in addition to the vitreous phases which formed in the coatings in this comparative process, the coatings included a practically pure crystalline phase of $TiO_2$. When the coated glass was bent to its breaking point following the completion of the phase transformation, it shattered into very small noncutting pieces. The Mohs hardness reached a value of 7.5.

EXAMPLE 3

A further process was then performed identical with that just described immediately above except that 5% by weight of alumina (grain size <30 microns) was added to the powdered glass in the hopper 30, in addition to the 1% by weight of titanium dioxide. The resulting coated glass had similar properties to that obtained by the previous process but the surface hardness was greater. The Mohs hardness reached a value of 8.5 in ten hours. This is attributable to the appearance of a crystalline phase rich in corundum in the coating layers. After the treatment it was found to be very difficult to score or scratch the coatings.

EXAMPLE 4

Vitroceramic sheets were produced from a batch having the following composition, by weight:

| | Percent |
|---|---|
| $SiO_2$ | 50 |
| $Al_2O_3$ | 25 |
| $Li_2O$ | 8 |
| $TiO_2$ | 4 |
| CaO | 7 |
| $P_2O_5$ | 6 | by suitable melting, refining, molding and then a thermal treatment for 80 hours at 700° C. The vitroceramic material was crystalline at the interior of the sheets and was opaque, but contained, at least in the surface regions of the sheets, a vitreous phase in a proportion of about 25%. The material was fragile and had a tensile strength of 11 kg./mm.² To strengthen the sheets, first 10% by weight of AgCl was deposited, and then 20% SiO, 50% $CaSiO_3$ and 20% $Al_2O_3$ by weight were simultaneously deposited on the sheets by evaporation in vacuo and in the absence of light. The sheets were then subjected to a heat treatment at 600° C., still in darkness, for 20 hours. Phase transformation took place in the deposited coating films with the result that the coatings were composed of three phases: aluminum silicate, calcium aluminate and silver chloride. The sheets had photographic properties and their tensile strength had been increased to 100 kg./mm.²

EXAMPLE 5

Bottles and electric insulators of borosilicate glass formed from a batch having the following composition, by weight:

| | Percent |
|---|---|
| $SiO_2$ | 60 |
| $Na_2O$ | 12 |
| CaO | 10 |
| MgO | 6 |
| $B_2O_2$ | 6 |
| $P_2O_5$ | 1 |
| $Al_2O_3$ | 5 | were coated by evaporation in vacuo with a deposit of 60% $SiO_2$, 10% $Al_2O_3$, 10% CaO, 5% MgO, 5% $TiO_2$, 10 $Na_2O$ (percentages by weight), the coatings having a thickness of 0.1 micron.

The bottles were then irradiated with X-rays to initiate nucleation therein and were subsequently heat-treated for one hour at 500° C. during which time the bottles were intermittently subjected for periods of 5 seconds, at intervals of 30 seconds, to ultrasonic pulsations with a frequency of 50,000 Hz. The applied power was 0.2 watt/cm.²

Separate crystalline phases were found to appear in the coatings, the notable phases being, inter alia, rutilium, sphene, wallastonite, diopside, enstatite and albite, embedded in a vitreous phase. The impact and vibrational strength of the bottles was doubled by the process, and on breakage, the articles shattered into small substantially noncutting fragments.

EXAMPLE 6

Figure 3:
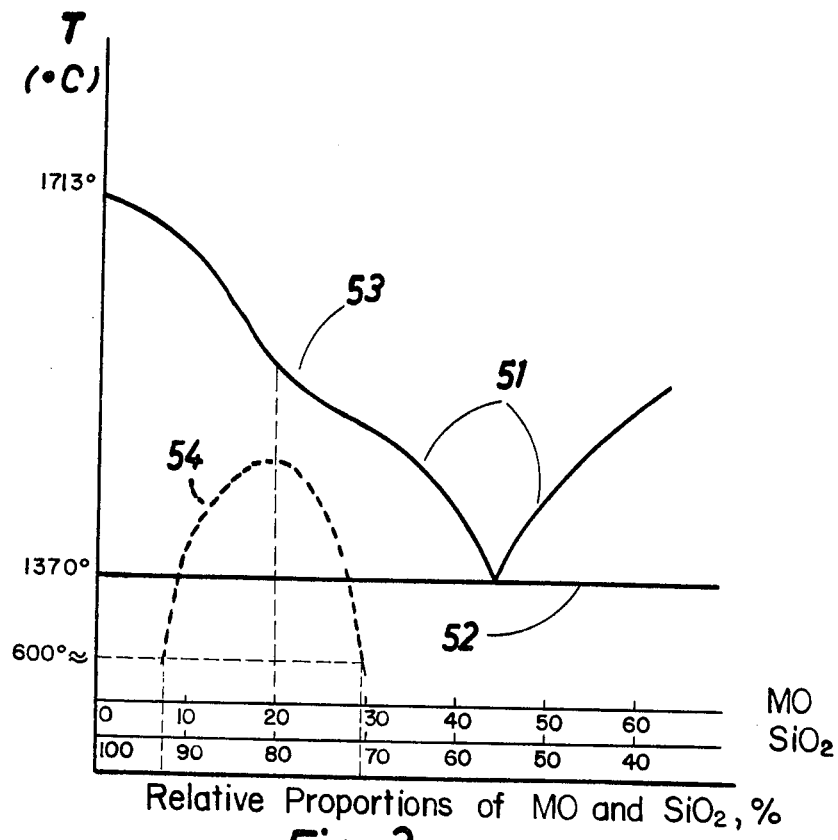
FIG. 3 is a chart used in explaining the features of the present invention.

FIG. 3 is a graph relating to a glass having separated phases and formed from 5% $P_2O_5$ and 95% of a mixture of $SiO_2$ and MO, where M represents a suitable cation, such as barium. The relative proportions of $SiO_2$ and MO, by weight, are plotted along the abscissa and the temperature on the ordinate. The liquidus curve 51 is also shown, as well as a horizontal line 52 indicating the end of the liquidus state and the start of the solid state. In the liquidus curve there is a depression 53 believed to be attributable to a demixing zone 54. A glass was formed having a composition corresponding to the abscissa value of the depression 53. Upon cooling the glass, it was found that in fact a demixing or phase separation zone 54 existed partly below and partly above the horizontal line 52. A glass of the same composition was used to form a film on a glass substrate and then cooled so that phase separation occurred. In the resulting article the substrate was strengthened and could withstand tensile loads which would otherwise have caused surface cracks existing in the substrate to be propagated.

The diagram serves to indicate the manner in which other glass batches whose demixing properties have not hitherto been recognized can be investigated.

The curve 54 of the diagram represents the upper boundary of the separation zone.

In a specific example a glass melt was prepared starting from the following composition:

| | Percent |
|---|---|
| $P_2O_5$ | 5 |
| $SiO_2$+BaO | 95 | the proportions of $SiO_2$ and BaO being respectively 80 and 20%. The batch was melted at a temperature which for the given proportion of $SiO_2$ and BaO was located above the liquidus curve 53 of FIG. 3.

The melt was applied upon the two surfaces of a preheated ordinary soda-lime glass sheet and allowed to cool quickly to a temperature of 600° C. at which it was maintained for several hours. At that temperature phase separation occurs giving two vitreous phases having the compositions indicated in FIG. 3 by the intersection of a horizontal line passing through the ordinate of 600° C. with the two branches of the demixion curve 54.

EXAMPLE 7

A glass of ordinary composition in the form of a sheet 1 m. x 1 m. x 0.003 m. in size with a Mohs surface hardness of 6.2 was coated at 80° C. by deposition of the following oxides by simultaneous vaporization in vacuo, in the molar proportions indicated:

| | Percent |
|---|---|
| $Fe_2O_3$ | 0.5 |
| MgO | 1 |
| $MnO_2$ | 1 |
| $TiO_2$ | 5 |
| $Al_2O_3$ | 5 |
| CaO | 3 |

The thickness of the coating was about 0.02 micron. The coating was exposed to radiant heat to increase its temperature progressively up to 1000° C. while the sheet was disposed on a flat surface. After cooling, an abundant crystallization became manifest, the crystalline phases comprising ilmenite and anatase embedded in an amorphous phase of calcium aluminate. The coated glass now had a Mohs surface hardness of 6.5 and could be readily cut. The coated surface was then irradiated with X-rays for 24 hours at 800° C. On cooling of the glass, it was found that the phases previously formed had been transformed, with the appearance of rutilium, corundum, pyrolusite, calcium aluminate, hematite and a little ilmenite, which were finely dispersed and which overlapped one another. The surface hardness was then 8.2 on the Mohs scale.

It will be understood that the above description of the present invention is susceptible to various modifications, changes and adaptations, and the same are intended to be comprehended within the meaning and range of equivalents of the appended claims.

We claim:

1. A process for physically strengthening a body made of at least partly vitreous material, comprising the steps of: attaching to the body a coating of a material whose chemical composition is different from that of the body and is such that at least one coating ingredient can undergo a solid-to-solid phase transformation which gives the coating a hardness at least equal to that of the body; and then causing such phase transformation to take place, the body being constituted by a vitroceramic sheet having the following composition, by weight:

| | Percent |
|---|---|
| $SiO_2$ | 50 |
| $Al_2O_3$ | 25 |
| $Li_2O$ | 8 |
| $TiO_2$ | 4 |
| CaO | 7 |
| $P_2O_5$ | 6 | the sheet having been produced by being suitably melted, refined and molded and by then being subjected to a thermal treatment which gives the material a crystalline form at its interior and a vitreous phase in its surface region; said step of attaching a coating comprising vaporising in vacuo and in the absence of light a coating having the following composition, by weight:

| | Percent |
|---|---|
| AgCl | 10 |
| SiO | 20 |
| $CaSiO_3$ | 50 |
| $Al_2O_3$ | 20 | the vaporization comprising two successive stages, the first stage of which comprises depositing only the AgCl and the second stage of which comprises depositing the remaining ingredients of the coating; and said step of causing such phase transformation to take place comprising subjecting the coated sheet to a heat treatment at 600° C. for 20 hours in the absence of light.

2. A process for physically strengthening a body made of at least partly vitreous material, comprising the steps of: attaching to the body a coating of a material whose chemical composition is different from that of the body and is such that at least one coating ingredient can undergo a solid-to-solid phase transformation which gives the coating a hardness at least equal to that of the body; and then causing such phase transformation to take place, the body being a borosilicate glass having the following composition, by weight:

| | Percent |
|---|---|
| $SiO_2$ | 60 |
| $Na_2O$ | 12 |
| CaO | 10 |
| MgO | 6 |
| $B_2O_3$ | 6 |
| $P_2O_5$ | 1 |
| $Al_2O_3$ | 5 | said step of attaching a coating comprising vaporizing, in a vacuo, a mixture composed of, by weight,

| | Percent |
|---|---|
| $SiO_2$ | 60 |
| $Al_2O_3$ | 10 |
| CaO | 10 |
| MgO | 5 |
| $TiO_2$ | 5 |
| $Na_2O$ | 10 | onto the body to produce a coating having a thickness of the order of 0.1 micron; and said step of causing such phase transformation to take place comprising subjecting the coated body to X-rays, then heat-treating the body for 1 hour at 500° C. while intermittently subjecting the body to ultrasonic pulsations having a frequency of 50,000 Hz., the pulsations being applied for periods of 5 seconds at intervals of 30 seconds.

3. A process for physically strengthening a body made of at least partly vitreous material, comprising the steps of: attaching to the body a coating of a material whose chemical composition is different from that of the body and is such that at least one coating ingredient can undergo a solid-to-solid phase transformation which gives the coating a hardness at least equal to that of the body; and then causing such phase transformation to take place, the body being of an ordinary glass, said step of attaching comprising coating the glass at 80° C. by a vaporization in vacuo of a mixture of the following ingredients having the indicated molar proportions:

| | Percent |
|---|---|
| $Fe_2O_3$ | 0.5 |
| MgO | 1 |
| $MnO_2$ | 1 |
| $TiO_2$ | 5 |
| $Al_2O_3$ | 5 |
| CaO | 3 | to form a coating having a thickness of about 0.02 micron; and said step of causing such phase transformation to take place comprising exposing the coated body to radiant heat for bringing its temperature up to a value of 1000° C.

4. A process as defined in claim 3 wherein said step of causing such phase transformation to take place comprises the subsequent operation of irradiating the resulting coated body with X-rays for 24 hours while maintaining the body at a temperature of 800° C.

5. A process for physically strengthening a body made of at least partly vitreous material, comprising the steps of: attaching to the body a coating of a material whose chemical composition is different from that of the body and is such that at least one coating ingredient can undergo a solid-to-solid phase transformation which gives the coating a hardness at least equal to that of the body; and then effecting such phase transformation in the solid state; the phase transformation being one of the following:

(a) from an initial vitreous phase to a new vitreous phase,
(b) from an initial vitrocrystaline phase to a new vitreous phase,
(c) from an initial crystalline phase to a vitreous phase, and
(d) from an initial crystalline phase to a new crystalline phase, wherein said step of effecting such phase transformation comprises exposing the coating to vibrations having a frequency of greater than 10,000 Hz.

6. A process for physically strengthening a body made of at least partly vitreous material, comprising the steps of: attaching to the body a coating of a material whose chemical composition is different from that of the body and is such that at least one coating ingredient can undergo a solid-to-solid phase transformation which gives the coating a hardness at least equal to that of the body; and then effecting such phase transformation in the solid state; the phase transformation being one of the following:

(a) from an initial vitreous phase to a new vitreous phase,
(b) from an initial vitrocrystalline phase to a new vitreous phase,
(c) from an initial crystalline phase to a vitreous phase, and
(d) from an initial crystalline phase to a new crystalline phase, wherein the coating before phase transformation is a glass coating having a phase diagram with a demixing zone as illustrated in FIG. 3 and the composition is within the demixing zone.

7. A process for physically strengthening a body made of at least partly vitreous material, comprising the steps of: attaching to the body a coating of a material whose chemical composition is different from that of the body and is such that at least one coating ingredient can undergo a solid-to-solid phase transformation which gives the coating a hardness at least equal to that of the body, and then effecting such phase transformation in the solid state; the phase transformation being one of the following:

(a) from an initial vitreous phase to a new vitreous phase, (b) from an initial vitrocrystalline phase to a new vitreous phase,
(c) from an initial crystalline phase to a vitreous phase, and
(d) from an initial crystalline phase to a new crystalline phase, wherein the coating is a glass coating having an initial composition within the demixing zone of FIG. 3.

References Cited

UNITED STATES PATENTS

| | | | |
|---|---|---|---|
| 3,503,763 | 3/1970 | Mills | 63—33 X |
| 1,941,392 | 12/1933 | Engels | 65—60 X |
| 2,382,187 | 8/1945 | Vang | 65—35 |
| 3,445,209 | 5/1969 | Asumnga | 65—30 X |
| 3,463,658 | 8/1969 | Budd | 65—60 X |
| 3,464,880 | 9/1969 | Rinehart | 65—30 X |
| 3,475,150 | 10/1969 | Bishop et al. | 65—60 |

OTHER REFERENCES

Kingery, W. D.: Introduction to Ceramics, John Wiley & Sons, Inc., 1960, pp. 483–486.

Kingery, W. D.: Introduction to Ceramics, John Wiley & Sons, Inc. (1960), pp. 70–71.

S. S. Singer: Industrial Ceramics, Chapman & Hall Ltd. (1963), p. 170.

FRANK W. MIGA, Primary Examiner

U.S. Cl. X.R.

65—30, 35, 60, 95; 106—39, 43; 117—124

UNITED STATES PATENT OFFICE
CERTIFICATE OF CORRECTION

Patent No. 3,676,097          Dated  July 11th, 1972

Inventor(s) Emile Plumat and Robert Van Laethem

It is certified that error appears in the above-identified patent and that said Letters Patent are hereby corrected as shown below:

Column 1, line 4 of the heading of the patent, change "van Laethem" to --Van Laethem--; after "53,548" in line 9, insert -- ; Great Britain, March 4, 1968, 10,459/68--. Column 3, lines 15 and 16, change "suscetpible" to --susceptible--. Column 5, delete line 5; line 33, before "in" insert a comma --,--; lines 74 and 75, change "photographic" to --phototropic--. Column 6, line 52, change "watts/m.$^2$" to --watts/m$^2$--. Column 8, line 46, change "film" to --films--. Column 9, line 18, change "kg./mm.$^2$" to --kg/mm$^2$--; line 40, change "B$_2$O$_2$" to --B$_2$O$_3$--; line 45, before "Na$_2$O" insert --%--. Column 12, change "vitrocrystaline" to --vitrocrystalline--, in line 33.

Signed and sealed this 6th day of March 1973.

(SEAL)
Attest:

EDWARD M. FLETCHER, JR.          ROBERT GOTTSCHALK
Attesting Officer                Commissioner of Patents